(12) United States Patent
Schmidt et al.

(10) Patent No.: US 6,341,747 B1
(45) Date of Patent: Jan. 29, 2002

(54) NANOCOMPOSITE LAYERED AIRFOIL

(75) Inventors: Wayde R. Schmidt, Pomfret Center; Harry E. Eaton, Jr., Woodstock, both of CT (US)

(73) Assignee: United Technologies Corporation, Hartford, CT (US)

( * ) Notice: Subject to any disclaimer, the term of this patent is extended or adjusted under 35 U.S.C. 154(b) by 0 days.

(21) Appl. No.: 09/429,386

(22) Filed: Oct. 28, 1999

(51) Int. Cl.[7] .............................. B64C 3/24; F01D 5/14
(52) U.S. Cl. ........................ 244/123; 244/121; 244/133; 416/224
(58) Field of Search .............................. 244/123, 117 R, 244/119, 131, 133; 416/224, 229 A; 29/889.71; 525/102, 104

(56) References Cited

U.S. PATENT DOCUMENTS

| | | | |
|---|---|---|---|
| 5,376,599 A | * 12/1994 | Oshima et al. ................ 501/90 |
| 5,449,273 A | 9/1995 | Hertel et al. ................ 416/224 |
| 5,542,820 A | 8/1996 | Eaton et al. ................ 416/224 |
| 5,643,843 A | * 7/1997 | Dunmead et al. ............. 501/92 |
| 5,726,247 A | 3/1998 | Michalczyk et al. ........ 525/102 |
| 5,881,972 A | 3/1999 | Smith et al. ................ 244/123 |
| 5,894,008 A | * 4/1999 | Na .............................. 264/661 |

* cited by examiner

*Primary Examiner*—Galen L. Barefoot

(57) ABSTRACT

The present invention is a nanocomposite layer applied to the leading edge of an airfoil. The nanocomposite is an elastomeric matrix reinforced with nanosized reinforcing particles ranging in size from about 0.5 to 1000 nanometers and preferably ranging in size from about 5 to 100 nanometers. These nanosized reinforcing particles improve the mechanical properties of a pure elastomer. Improving such properties assists the nanocomposite layer in absorbing and dissipating the impact energy caused by the repeated impact of particulate matter, such as sand and rain. Adding the nanosized reinforcing particles to an elastomer allows the nanocomposite to absorb the impact energy over a larger volume in comparison to a pure elastomeric material. The nanocomposite layer is, therefore, capable of withstanding the repeated impact caused by the particulate matter for a greater length of time compared to a pure elastomer. Applying a nanocomposite layer over an aerodynamic member also increases the airfoil's wear resistance. Hence the present invention increases the airfoil's durability, thereby reducing the frequency at which the airfoil may require repair.

29 Claims, 4 Drawing Sheets

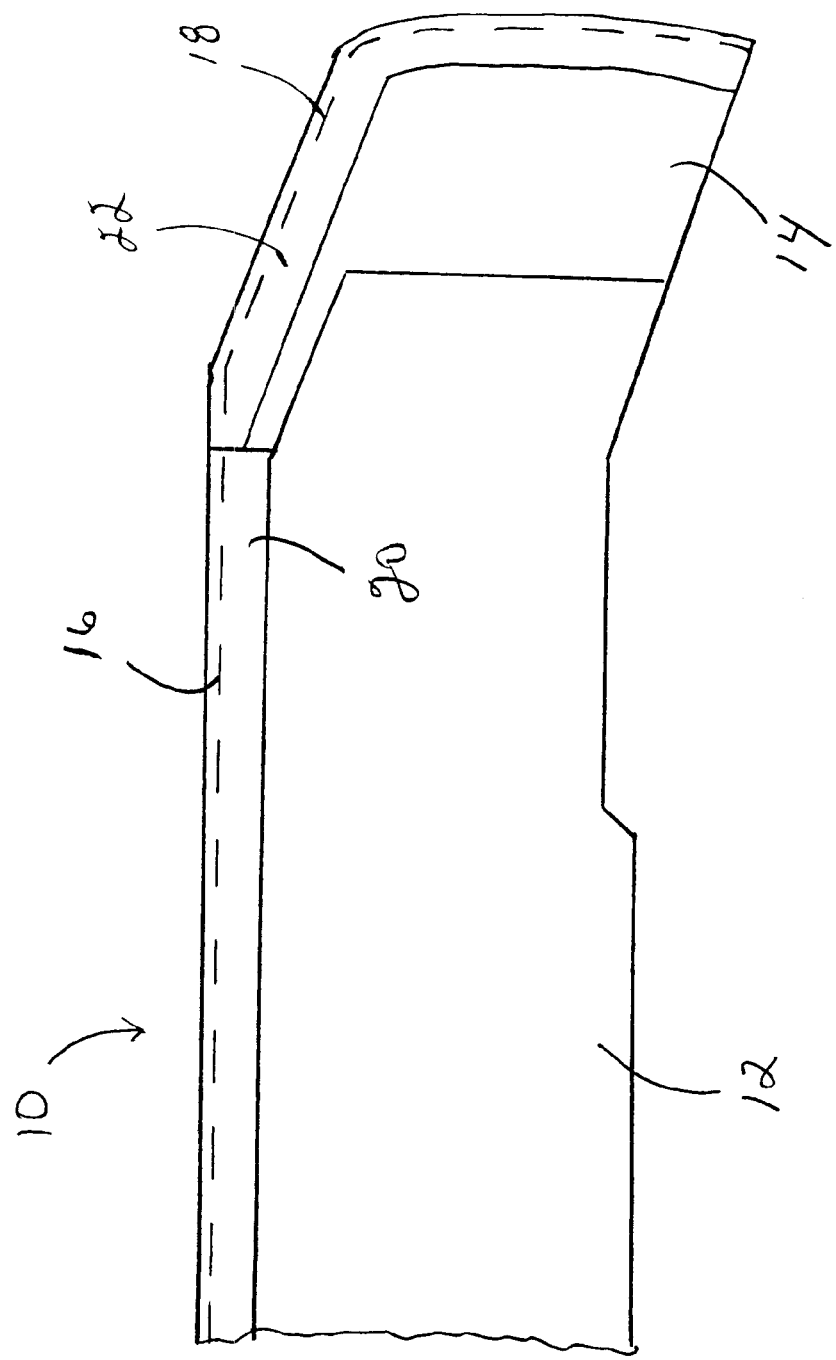

NANOCOMPOSITE LAYERED AIRFOIL

TECHNICAL FIELD

This invention relates to airfoils and more particularly, to an erosion resistant nanocomposite layered airfoil.

BACKGROUND ART

As airfoils, such as propellers, helicopter rotor blades, and gas turbine blades translate, they pass through the air and create certain directional forces. For example, as a helicopter rotor blade rotates through the air, the blade creates lift, thereby elevating the helicopter. The air through which the helicopter rotor blade rotates, however, may contain particulate matter, such as sand. The size of sand typically ranges from about 0.1 to 2000 microns and more typically from about 20 to 30 microns. If the air contains sand, the sand impinges upon the airfoil as it rotates, thereby causing abrasion to the airfoil, or portions thereof. Unless the airfoil is adequately protected, such repetitive abrasive contact could eventually cause the airfoil to erode.

The potential for erosion also exists if the airfoil circulates through air containing particulate matter such as water droplets (i.e., rain). The size of water droplets ranges from about 1000 to 4000 microns and is typically about 2000 microns. Although the size of the water droplets is typically greater than the size of sand, under high velocity conditions, such as those in this instance, water droplets behave similarly to sand, thereby causing erosion. Moreover, the combination of rain and sand exacerbates the amount of abrasion caused by such particulate matter. Therefore, when translating an airfoil through air comprising both rain and sand, the potential for erosion further increases.

The potential for erosion is also a function of the force at which the particulate matter impacts the airfoil. Specifically, as the impact force increases, so does the potential for erosion. The force at which the particulate matter impacts the airfoil is dependent upon the geometric shapes of both the airfoil and the impacting particle and their relative velocities. Particularly, the leading edge of the airfoil is the portion of the airfoil that first cleaves through the air. Therefore, the leading edge is the portion of the airfoil most susceptible to erosion caused by the particulate matter's abrasive contact.

The amount of erosion to the airfoil is also a function of the velocity at which the particulate matter impacts the leading edge. In other words, the potential for erosion increases as the rotational speed of the airfoil increases. Increasing the rotational speed of the airfoil, however, may be necessary to produce the desired lift or power. Hence, the desire for increased power or lift is counterproductive to erosion prevention. Because an airfoil typically rotates around a central axis, the velocity of the airfoil, relative to the air, differs along the leading edge of the airfoil. More specifically, the velocity at a point on an airfoil is equal to the product of the distance from the center rotational axis and the rotational rate of such airfoil. As the distance from the rotational axis along the leading edge of the airfoil increases, so does the velocity at a given point on the airfoil. The outboard tip of the airfoil is the furthest from the rotational axis. Therefore, the potential for erosion is greatest at the outboard tip of the leading edge of the airfoil.

Various techniques attempting to minimize the amount of erosion to the leading edge of airfoils currently exist. One such technique includes adhesively bonding an appropriately shaped piece of ductile metal onto the leading edge of the airfoil, such that the ductile metal is an integral part of the airfoil. The ductile metal leading edge is typically constructed of nickel, which provides increased wear resistance. The nickel's extended exposure to impinging particulate matter, however, causes the ductile metal leading edge to erode. The eroded nickel must, therefore, be replaced. Because the ductile metal leading edge is adhesively bonded to the airfoil, replacing the ductile metal leading edge requires a certain amount of time and skill, which is not typically available within the field. Repairs that are performed in the field are referred to as "field level" repairs because such repairs require an acceptable amount of time and a minimal amount of skill to complete. Repairs requiring an extended amount of time and a heightened skill level occur back at the aircraft depot and are referred to as "depot" repairs. Depot repairs are undesirable because depot repairs increase the amount of time that the aircraft is unavailable in comparison to a field level repair. Because the replacement of the ductile metal leading edge is considered a depot repair, bonding ductile metal onto the leading edge of an airfoil is an undesirable technique for minimizing erosion.

One type of "field level" repair technique for improving an airfoil's wear resistance includes applying an elastomeric material to the leading edge of the airfoil. Typically, the elastomeric material is applied to the leading edge as a tape. As the tape becomes worn, it can quickly and easily be removed, and a new layer of tape can be applied. Unfortunately, the frequency at which the elastomeric tape must be replaced is high compared to the rate at which the metal leading edge must be replaced because the elastomer's ability to resist erosion, caused by the combined rain and sand, is less than that of nickel. Specifically, the elastomeric tape fails to adequately absorb the impact energy of the particulate matter. Without adequate absorption capabilities, the elastomer fails to dissipate the impact energy, thereby allowing the particulate matter to tear (i.e., destroy) the elastomer. Without frequent replacement of the elastomeric tape, the leading edge of the airfoil remains unprotected. The elastomeric tape, therefore, fails to adequately protect the airfoil from erosion for any substantial amount of time.

An alternate technique for increasing the airfoil's wear resistance includes producing an engineered ceramic component, as discussed in U.S. Pat. No. 5,542,820, which is hereby incorporated by reference. That patent describes an engineered ceramic component having an aerodynamic ceramic member encapsulating a ductile composite infrastructure with a strain isolator member therebetween. The strain isolator member provides strain attenuation between the aerodynamic ceramic member and the ductile composite infrastructure. The engineered ceramic component is a structure comprised of five layers. Two of the five layers include adhesive bond layers. One adhesive bond layer exists between the strain isolator member and the aerodynamic ceramic member, and the other adhesive bond layer exists between the strain isolator member and the ductile composite infrastructure. The time and skill level required to replace this complex structure more closely resembles that for replacing the metal leading edges than that for replacing the elastomeric tape. Replacing the engineered ceramic component, therefore, is more closely related to a depot repair than a field level repair. Although it is possible to replace the multi-layered structure in the field, doing so is more complex than replacing the elastomeric tape. Furthermore, the cost of an engineered ceramic component makes this an expensive repair.

What is needed is an inexpensive, uncomplicated "field level" repair technique that provides similar benefits as the engineered ceramic component, thereby increasing the airfoil's wear resistance, without the need to frequently repeat the process.

DISCLOSURE OF INVENTION

The present invention is a nanocomposite layer applied to the leading edge of an airfoil. The nanocomposite is an elastomeric matrix reinforced with nanosized reinforcing particles ranging in size from about 0.5 to 1000 nanometers and preferably ranging in size from about 5 to 100 nanometers. These nanosized reinforcing particles have properties that improve the properties of a pure elastomer. Such improved properties include increased thermal conductivity, modulus of stiffness, hardness, and velocity of sound. Improving such properties assists the nanocomposite layer in absorbing and dissipating the impact energy of the particulate matter over a larger volume in comparison to a pure elastomeric material. Specifically, because the size of sand is typically about 20 to 30 microns and the size of the water droplets is typically about 2000 microns, the size of the particulate matter is about 200 to 400,000 times larger than the size of the nanosized reinforcing particles. Hence, there is significant number of reinforcing particles per unit volume. In comparison to a pure, unreinforced elastomer, the nanocomposite layer is able to dissipate the particulate matter's impact energy over a greater volume. Distributing the impact energy over a larger volume, thereby, reduces the energy density of the nanocomposite layer. The nanocomposite layer is, therefore, capable of withstanding the repeated impact caused by the particulate matter for a greater length of time compared to a pure elastomer. Because the life expectancy of a nanocomposite layer is greater than that of an elastomer, incorporating the present invention into a tape or coating would reduce the frequency at which it would need to be replaced.

Incorporating nanosized reinforcement particles into an elastomeric matrix also creates a more impact resistant layer than incorporating conventional reinforcement particles into such a matrix because conventional reinforcement particles are typically micron sized particles or fibers. Nanosized reinforcement particles are typically at least one hundred times smaller than conventional reinforcement particles. Incorporating nanosized reinforcement particles into an elastomeric matrix creates a more impact resistant layer than would incorporating conventional reinforcement particles or fibers into such a matrix because while the size of the impact area remains constant, the degree of reinforcement per unit volume of impact increases. In other words, utilizing nanosized reinforcing particles in lieu of conventional reinforcement particles significantly increases the number of reinforcing particles per unit volume. Thus, the impact energy density decreases. Hence, the nanocomposite layer's increased reinforcement allows it to absorb and dissipate a greater amount of impact energy than a conventionally reinforced elastomer. The nanocomposite layer, therefore, is capable of withstanding the repeated impact caused by the particulate matter for a greater period compared to a conventionally reinforced elastomer.

Accordingly, the present invention relates to an airfoil that includes a nanocomposite layer affixed to an aerodynamic member, wherein the nanocomposite layer is an elastomeric material reinforced with nanometer sized reinforcing particles. The nanocomposite layer is applied to the aerodynamic member as either an adhesive tape or a coating, which is mechanically and/or chemically bonded to the aerodynamic member. If the nanocomposite layer is applied as a coating, the nanocomposite layer can be dip-coated, sprayed on or painted onto the aerodynamic member. Applying the nanocomposite layer either as a tape or spraying or painting it on the aerodynamic member are simple and relatively quick procedures such that the nanocomposite layer can be applied in the field, thereby improving the aircraft's availability time.

Applying a nanocomposite layer over an aerodynamic member also increases the airfoil's wear resistance. Hence the present invention increases the airfoil's durability, thereby reducing the frequency at which the airfoil may require repair. Additionally, the nanocomposite layer is less expensive than an engineered ceramic component. The present invention, therefore, is a relatively inexpensive and simple "field level" repair technique that increases an airfoil's wear resistance in an erosive environment such that the repair technique is required on an infrequent basis.

The foregoing features and advantages of the present invention will become more apparent in light of the following detailed description of exemplary embodiments thereof as illustrated in the accompanying drawings.

BRIEF DESCRIPTION OF DRAWINGS

FIGS. 1A to 1C are plan views of various airfoils having a nanocomposite layer affixed thereto, wherein:

FIG. 1A is a plan view of the nanocomposite layer of the present invention affixed to the leading edge of a helicopter rotor blade;

FIG. 1B is a plan view of the nanocomposite layer of the present invention affixed to the leading edge of a compressor blade; and FIG. 1C is a plan view of the nanocomposite layer of the present invention affixed to the leading edge of a propeller.

BEST MODE FOR CARRYING OUT THE INVENTION

Figure 1B:
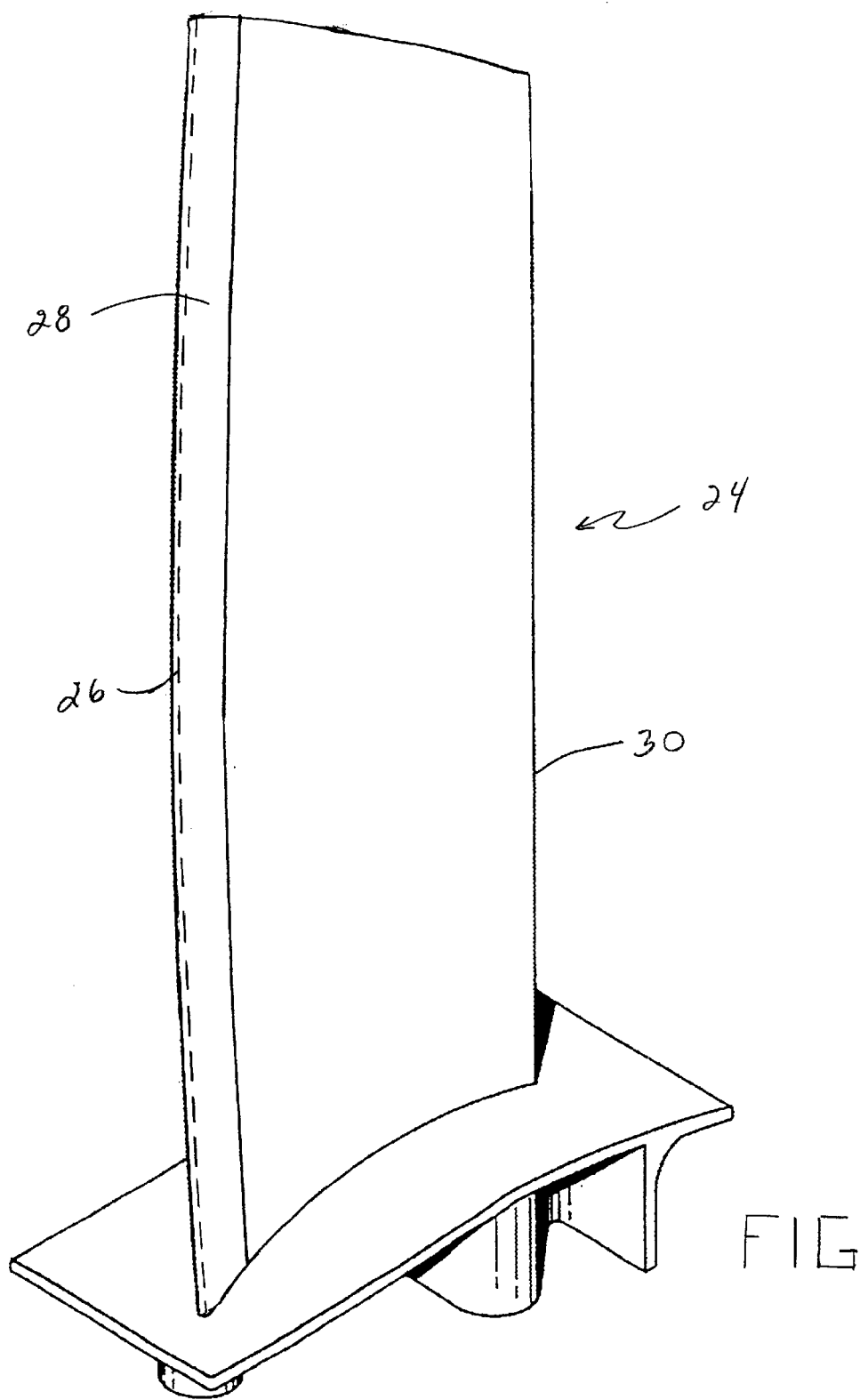
Figure 1C:
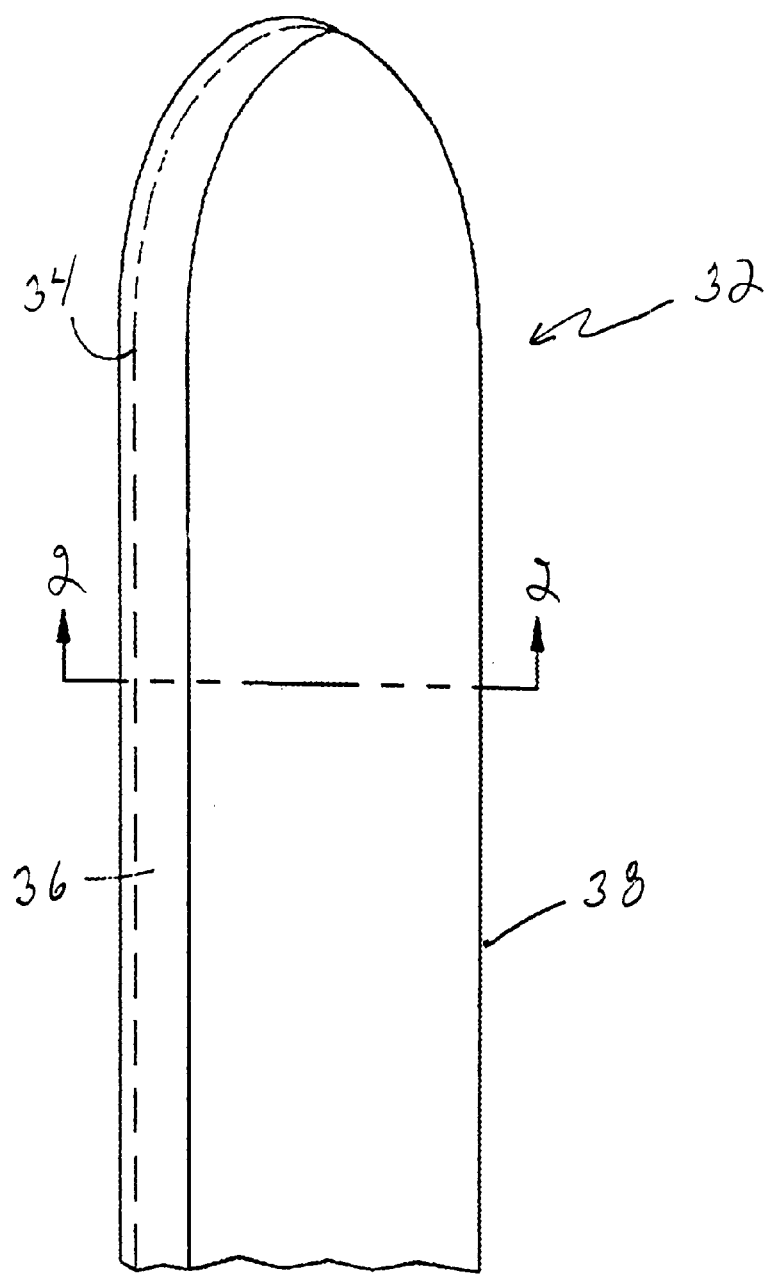

Referring to FIGS. 1A—1C, there is shown a nanocomposite layer of the present invention affixed to a variety of airfoils. Specifically, FIG. 1A illustrates an aerodynamic member, namely a helicopter rotor blade 10 comprising an intermediate section 12 and a tip section 14. The intermediate section 12 comprises a leading edge 16, and the tip section 14 comprises a leading edge 18. Nanocomposite layers 20, 22 are affixed to leading edges 16, 18, respectively.

Referring to FIG. 1B, there is shown a compressor blade 24 comprising an aerodynamic member 30 and a nanocomposite layer 28, which is affixed to the leading edge 26 of the aerodynamic member 30. Although not shown, a fan blade closely resembles the compressor blade 24. Hence, the present invention could also be applied to a fan blade.

Referring to FIG. 1C, there is shown a propeller 32 comprising an aerodynamic member 38 and a nanocomposite layer 36, which is affixed to the leading edge 34 of the aerodynamic member 38.

Figure 2:
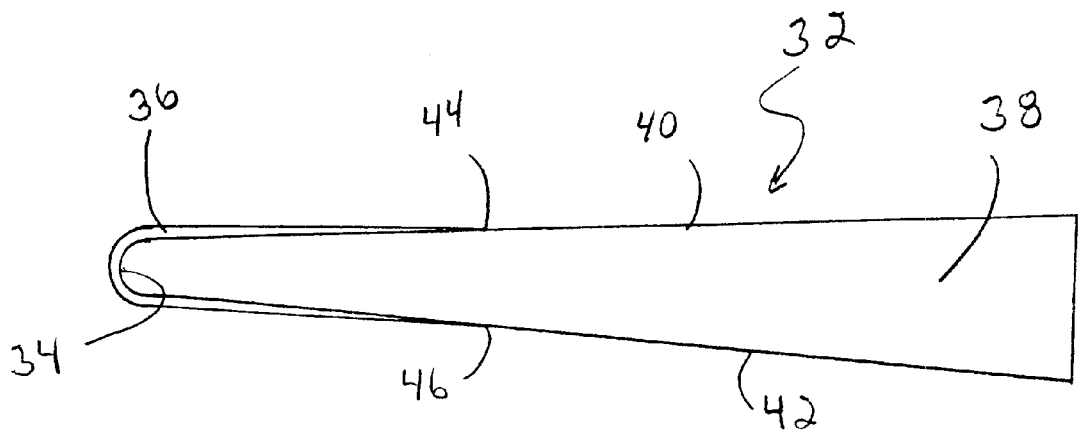
FIG. 2 is a cross-sectional view of the propeller in FIG. 1C taken along line 2—2.

Referring to FIG. 2, there is shown a cross-sectional view of the propeller 32 illustrated in FIG. 1C. The propeller 32 includes an aerodynamic member 38 and a nanocomposite layer 36, which is affixed to the aerodynamic member 38 and wraps around its leading edge 34. Although the identification of each side of the aerodynamic member 38 depends upon its orientation, one side 40 of the aerodynamic member 38 is typically referred to as the suction side, and the other side 42 is typically referred to as the pressure side. The nanocomposite layer 36 has a trailing edge 44 on the suction side 40 and an other trailing edge 46 on the pressure side 42.

FIG. 2 illustrates that the length of the nanocomposite layer 36 is similar on the suction and pressure sides 40, 42. The length of the nanocomposite layer 36 on the suction side 40 and pressure side 42, however, may differ. Additionally, the nanocomposite layer 36 may only need to be affixed to either the suction side 40 or pressure side 42. The thickness of the nanocomposite layer 36 may also vary from the leading edge 34 to the trailing edges 44, 46. Although the thickness of the nanocomposite layer 36 is dependent upon the type of airfoil and the airfoil's application, the nanocomposite layer 36 is typically thicker at the leading edge 34 and reduces as the nanocomposite layer 36 approaches the trailing edges 44, 46. Moreover, it is typically desirable to apply a nanocomposite layer 36 having an average thickness that is greater than or equal to about 0.005 inches. Such a thickness allows the nanocomposite layer 36 to absorb the impact energy of the particulate matter. The nanocomposite layer 36, thereby, dissipates impact energy more effectively within itself than a pure elastomeric material. Hence, applying such a nanocomposite layer to the leading edge of an aerodynamic member not only protects the aerodynamic member from erosion but does so for an extended period of time.

Figure 2A:
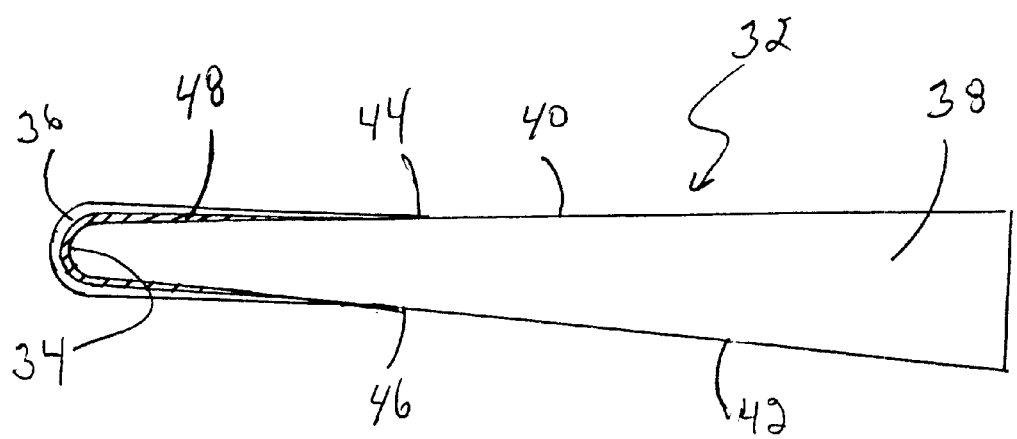
FIG. 2A is a cross-sectional view of an alternate embodiment of the present invention.

Continuing to refer to FIG. 2, the nanocomposite layer 36 can be affixed to the aerodynamic member 38 by applying the nanocomposite layer as a coating. Such coating techniques may include spraying, painting, or dip-coating a nanocomposite liquid onto the aerodynamic member 38. The nanocomposite liquid, thereafter, solidifies and becomes mechanically and/or chemically bonded to the aerodynamic member 38. Referring to FIG. 2A, the nanocomposite layer 36 can also be affixed to the aerodynamic member 38 as an adhesive tape. If nanocomposite layer 36 is applied as an adhesive tape, then an adhesive layer 48 would exist between the aerodynamic member 38 and the nanocomposite layer 36.

Whether applied as a tape or a coating, the nanocomposite layer 36 comprises an elastomer reinforced with nanometer sized reinforcing particles. It is preferable that the elastomer has a strain to failure of at least 20% and a tensile strength of at least 1000 psi. It is even more preferable that the elastomer has a strain to failure of at least 50% and a tensile strength of at least 3000 psi. It is especially preferable that the elastomer has a strain to failure of at least 100% and a tensile strength of at least 5000 psi. Elastomers such as polyurethanes, fluoropolymers, silicone rubber, natural rubber, polyolefins, chlorosulfonated polyethylene, chlorinated polyethylene, and ethylene-propylene copolymers and terpolymers can be classified to satisfy these requirements. An example of a possible polyurethane may include that which is manufactured by Air Products under the tradename Airthane®. Examples of a potentially suitable fluoropolymer include those manufactured by Dupont Dow Elastomers under the tradenames Viton® and Kalrez®. E.I. dupont de Nemours Company also manufactures Teflon® fluoropolymer. Another example of a possible fluoropolymer includes that which is manufactured by the Minnesota, Mining & Manufacturing Company (3M) under the tradenames Fluorel. Further examples of potential elastomers include Engage® polyolefin, Ascium® and Hypalon® chlorinated polyethylenes, and Tyrin® chlorinated polyethylene, all manufactured by Dupont Dow Elastomers. Another example of a possible polymer is a fluorinated polymer, such as polychlorotrifluoroethylene manufactured by 3M under the tradename Kel-F.

It is preferable that the nanosized reinforcing particles have a diameter ranging from about 0.5 to 1000 nanometers. It is even more preferable that the nanosized reinforcing particles, have a diameter ranging from about 1 to 500 nanometers. It is especially preferable that the nanosized reinforcing particles, have a diameter ranging from about 5 to 100 nanometers and even more preferable that the nanosized reinforcing particles have a diameter ranging from about 10 to 30 nanometers. It is also preferable that the nanosized reinforcing particles, have an aspect ratio ranging from about 1 to 1000. It is even more preferable that the nanosized reinforcing particles, have an aspect ratio ranging from about 1 to 100, and it is especially preferable that the nanosized reinforcing particles have an aspect ratio ranging from about 10 to 100. It is also preferable that the nanosized reinforcing particles have favorable mechanical and chemical properties, such as high hardness, abrasion resistance, high modulus of stiffness, high compressive strength, water resistance, and thermal stability. It is also preferable that the nanosized reinforcing particles account for about 0.1% to 50% of the weight of the nanocomposite layer. It is even more preferable that the nanosized reinforcing particles account for about 0.5 to 20% of the weight of the nanocomposite layer, and it is especially preferable that the nanosized reinforcing particles account for about 1.0% to 15% of such weight.

Depending upon the type of elastomer and the desired properties, the nanosized reinforcing particles may comprise aluminum oxide ($Al_2O_3$), silicon (Si), silicon oxide ($SiO_2$), silicon carbide (SiC), silicon aluminum oxy nitride (SiAlON), silicon nitride ($Si_3N_4$), tubular or fibrous fullerenes, other compatible oxides, nitrides, or carbides, or any combination thereof. The nanosized reinforcing particles may also comprise metallic or ceramic fibers and whiskers constructed of boron (B), iron (Fe), nickel (Ni), silicon carbide (SiC), silicon nitride ($Si_3N_4$), oxides and other nitrides, carbides and carbon-based compounds. If the nanosized reinforcing particles and the elastomer are not inherently compatible, it may be necessary to add a known coupling agent to the nanocomposite in order to combine the elastomer and the nanosized reinforcing particles. Dendrimers, a special type of an elastomer, may also be used as a reinforcing particle. Dendrimers are an attractive alternative due to their inherently small particle size and the ability to control their chemical properties.

The elastomer serves as a matrix for the nanosized reinforcing particles, which add the desired physical properties to the elastomer, thereby increasing the toughness and/or stiffness of the elastomeric matrix. Incorporating nanometer sized particles into the elastomeric matrix allows the nanocomposite to dissipate impact energy over a larger volume because the size of the particulate matter impacting the nanocomposite is significantly greater than the size of the nanosized reinforcing particles. This occurs because the degree of reinforcement (i.e., number of reinforcing particles per unit volume) increases by using nanosized reinforcement particles rather than using conventional (i.e., micron) sized reinforcement particles. The nanocomposite layer is, thereby, less susceptible to erosion than a pure elastomer. The nanocomposite layer, therefore, will typically have a longer useful life compared to a pure elastomer. The nanocomposite layer will also have a longer life expectancy than an elastomeric matrix reinforced with conventional reinforcing particles because a nanocomposite layer can absorb the particulate matter's impact energy over a significantly greater volume. Applying the nanocomposite layer onto an airfoil, especially its leading edge, reduces the energy density absorbed by the protective layer, thereby reducing its potential of eroding which, in turn, increases the airfoil's erosion resistance.

Although the invention has been described and illustrated with respect to the exemplary embodiments thereof, it should be understood by those skilled in the art that the foregoing and various other changes, omissions and additions may be made without departing from the spirit and scope of the invention.

What is claimed is:

1. An airfoil, comprising:
   (a) an aerodynamic member; and
   (b) a nanocomposite layer affixed to at least a portion of said aerodynamic member, wherein said nanocomposite layer is an elastomeric material reinforced with nanosized reinforcing particles having a particle size ranging from 0.5 to 1000 nanometers, and where said elastomer exhibits a strain to failure of at least about 20% and a tensile strength of at least 1000 psi.

2. The airfoil of claim 1 wherein said nanocomposite layer is affixed to a leading edge portion of said aerodynamic member.

3. The airfoil of claim 1 wherein said airfoil further comprises an adhesive bond layer between said aerodynamic member and said nanocomposite layer, said adhesive bond layer affixing said aerodynamic member to said nanocomposite layer.

4. The airfoil of claim 1 wherein said nanocomposite layer is chemically and/or mechanically bonded to said aerodynamic member.

5. The airfoil of claim 1 wherein said aerodynamic member is selected from the group consisting essentially of a propeller, a helicopter rotor blade, a compressor blade in a gas turbine and a fan blade in a gas turbine.

6. The airfoil of claim 1 wherein the elastomeric material is a fluoropolymer.

7. The airfoil of claim 6 wherein said nanosized reinforcing particles are selected from the group consisting essentially of aluminum oxide ($Al_2O_3$), silicon (Si), silicon oxide ($SiO_2$), silicon carbide (SiC), silicon aluminum oxy nitride (SiAlON), silicon nitride ($Si_3N_4$), boron (B), iron (Fe), nickel (Ni), carbon (C), and any combination thereof.

8. The airfoil of claim 6 wherein said nanosized reinforcing particles are dendrimers.

9. The airfoil of claim 6 wherein said nanosized reinforcing particles are selected from the group consisting essentially of tubular and fibrous fullerenes.

10. The airfoil of claim 1 wherein the elastomeric material is a polyurethane.

11. The airfoil of claim 10 wherein said nanosized reinforcing particles are selected from the group consisting essentially of aluminum ($Al_2O_3$), silicon (Si), silicon oxide ($SiO_2$), silicon carbide (SiC), silicon aluminum oxy nitride (SiAlON), silicon nitride ($Si_3N_4$), boron (B), iron (Fe), nickel (Ni), carbon (C), and any combination thereof.

12. The airfoil of claim 10 wherein said nanosized reinforcing particles are dendrimers.

13. The airfoil of claim 10 wherein said nanosized reinforcing particles are selected from the group consisting essentially of tubular and fibrous fullerenes.

14. The airfoil of claim 1 wherein the elastomeric material has a strain to failure of at least 20% and a tensile strength of at least 1000 psi.

15. The airfoil of claim 1 wherein said nanosized reinforcing particles have an aspect ratio ranging from about 0.5 to 1000.

16. The airfoil of claim 1 wherein said nanocomposite layer has a thickness equal to or greater than about 0.005 inches.

17. The airfoil of claim 1 wherein said nanosized reinforcing particles account for about 0.1% to 50% of the weight of said nanocomposite layer.

18. The airfoil of claim 17 wherein said nanosized reinforcing particles account for about 0.5% to 20% of the weight of said nanocomposite layer.

19. The airfoil of claim 18 wherein said nanosized reinforcing particles account for about 1.0% to 15% of the weight of said nanocomposite layer.

20. An airfoil, comprising:
   (a) an aerodynamic member selected from the group consisting essentially of a propeller, a helicopter rotor blade, a compressor blade in a gas turbine and a fan blade in a gas turbine; and
   (b) a nanocomposite layer affixed to the leading edge of said aerodynamic member, wherein said nanocomposite layer is a fluoropolymer reinforced with nanosized reinforcing particles selected from the group consisting essentially of aluminum oxide ($Al_2O_3$), silicon (Si), silicon oxide ($SiO_2$), silicon carbide (SiC), silicon aluminum oxy nitride (SiAlON), silicon nitride ($Si_3N_4$), boron (B), iron (Fe), nickel (Ni), carbon (C), and any combination thereof, said nanosized reinforcing particles having a size ranging from 0.5 to 1000 nanometers, said nanosized reinforcing particles having an aspect ratio ranging from about 1 to 1000, and where said fluoropolymer exhibits a strain to failure of at least about 20% and a tensile strength of at least 1000 psi.

21. The airfoil of claim 20 wherein said nanocomposite layer has a thickness equal to or greater than about 0.005 inches.

22. The airfoil of claim 20 wherein said airfoil further comprises an adhesive bond layer between said aerodynamic member and said nanocomposite layer, said adhesive bond layer affixing said aerodynamic member to said nanocomposite layer.

23. The airfoil of claim 20 wherein said nanocomposite layer is chemically and/or mechanically bonded to said aerodynamic member.

24. The airfoil of claim 20 wherein said nanosized reinforcing particles account for about 0.1% to 50% of the weight of said nanocomposite layer.

25. An airfoil, comprising:
   (a) an aerodynamic member selected from the group consisting essentially of a propeller, a helicopter rotor blade, a compressor blade in a gas turbine and a fan blade in a gas turbine; and
   (b) a nanocomposite layer affixed to the leading edge of said aerodynamic member, wherein said nanocomposite layer is a polyurethane reinforced with nanosized reinforcing particles selected from the group consisting essentially of aluminum oxide ($Al_2O_3$), silicon (Si), silicon oxide ($SiO_2$), silicon carbide (SiC), silicon aluminum oxy nitride (SiAlON), silicon nitride ($Si_3N_4$), boron (B), iron (Fe), nickel (Ni), carbon (C), said nanosized reinforcing particles having a size ranging from 0.5 to 1000 nanometers, said particles having an aspect ratio ranging from about 1 to 1000, and where said polyurethane exhibits a strain to failure of at least about 20% and a tensile strength of at least 1000 psi.

26. The airfoil of claim 25 wherein said nanocomposite layer has a thickness equal to or greater than about 0.005 inches.

27. The airfoil of claim 25 wherein said airfoil further comprises an adhesive bond layer between said aerodynamic member and said nanocomposite layer, said adhesive bond layer affixing said aerodynamic member to said nanocomposite layer.

28. The airfoil of claim 25 wherein said nanocomposite layer chemically and/or mechanically bonded to said aerodynamic member.

29. The airfoil of claim 25 wherein said nanosized reinforcing particles account for about 0.1% to 50% of the weight of said nanocomposite layer.

* * * * *